(12) United States Patent
Yamada

(10) Patent No.: US 11,578,974 B2
(45) Date of Patent: Feb. 14, 2023

(54) ROAD INCLINATION ESTIMATING APPARATUS OF VEHICLE

(71) Applicant: Toyota Jidosha Kabushiki Kaisha, Toyota (JP)

(72) Inventor: Yoshihisa Yamada, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 349 days.

(21) Appl. No.: 16/867,995

(22) Filed: May 6, 2020

(65) Prior Publication Data
US 2020/0355497 A1  Nov. 12, 2020

(30) Foreign Application Priority Data

May 8, 2019 (JP) .............................. JP2019-088183

(51) Int. Cl.
*G01C 9/00* (2006.01)
*G01H 1/00* (2006.01)
*B60W 40/076* (2012.01)

(52) U.S. Cl.
CPC .............. *G01C 9/00* (2013.01); *G01H 1/003* (2013.01); *B60W 40/076* (2013.01); *B60W 2520/28* (2013.01); *B60W 2552/15* (2020.02)

(58) Field of Classification Search
CPC .............. B62D 15/029; B62D 15/025; B60W 30/182; B60W 40/09; B60W 2552/15; B60W 40/076; B60W 2520/28
See application file for complete search history.

(56) References Cited

U.S. PATENT DOCUMENTS

| | | | | |
|---|---|---|---|---|
| 11,002,539 | B2* | 5/2021 | Unger | .............. B60G 17/01908 |
| 2013/0245888 | A1* | 9/2013 | Kikuchi | ................. B60G 17/06 |
| | | | | 701/38 |

FOREIGN PATENT DOCUMENTS

| | | | | |
|---|---|---|---|---|
| JP | 2003261017 | A | * 9/2003 | |
| JP | 2006200477 | A | * 8/2006 | ............ B60W 40/06 |
| JP | 2008-185418 | A | 8/2008 | |
| JP | 2010-241265 | A | 10/2010 | |
| JP | 2012101791 | A | * 5/2012 | ............ B60W 40/06 |

* cited by examiner

*Primary Examiner* — Jeff A Burke
*Assistant Examiner* — Jerrod Irvin Davis
(74) *Attorney, Agent, or Firm* — Dinsmore & Shohl LLP

(57) ABSTRACT

A road inclination estimating apparatus is configured to acquire power spectrum density of vertical vibration by a frequency analysis based on the detected vertical acceleration of the sprung mass of a vehicle. The apparatus is configured to determine that a first estimation condition is satisfied, when the power spectrum density has two of the acquired peak frequencies, wherein, one of the two of the peak frequencies is within a predetermined first frequency range, and the other one of the two of the peak frequencies is within a predetermined second frequency range.

4 Claims, 11 Drawing Sheets

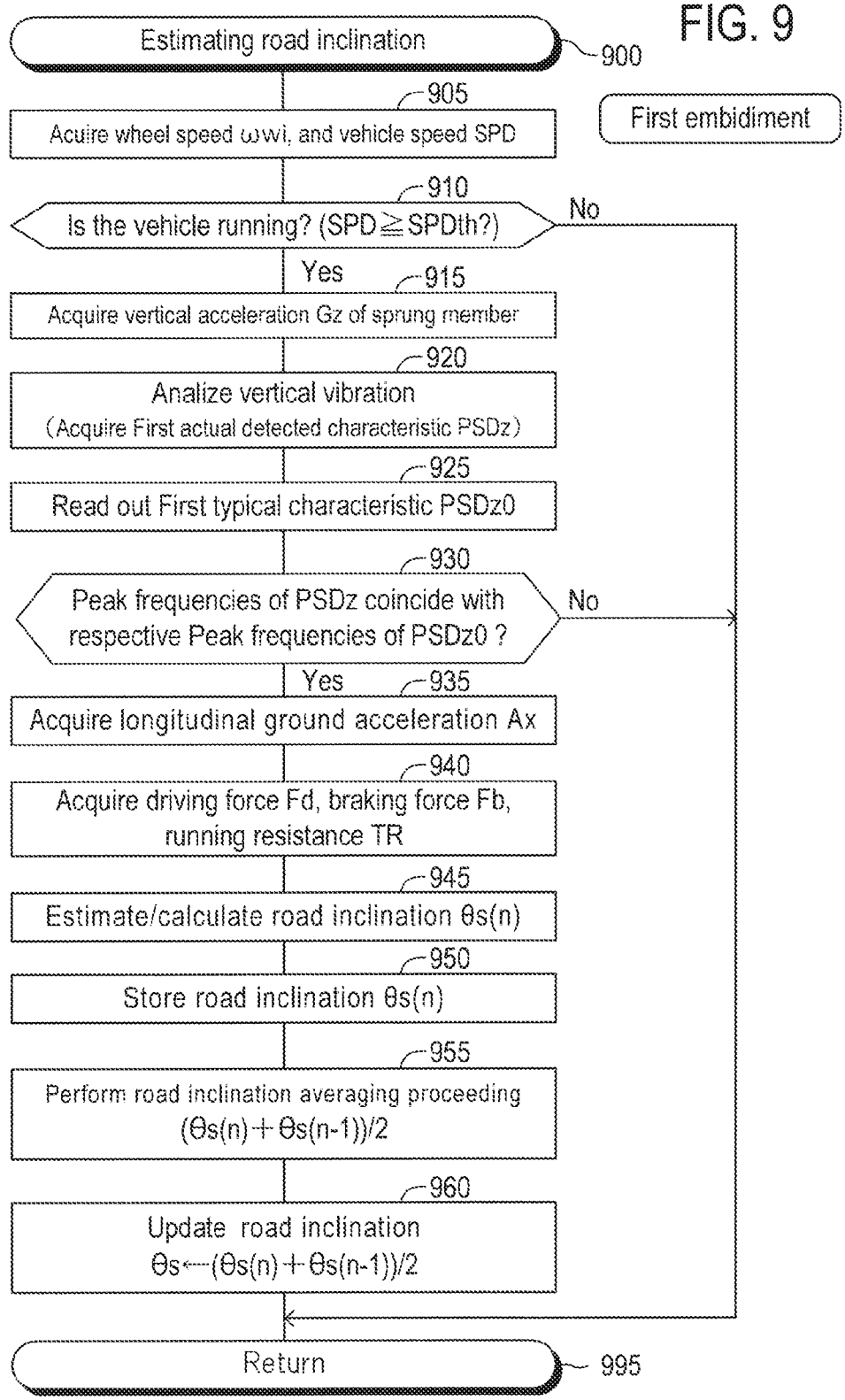

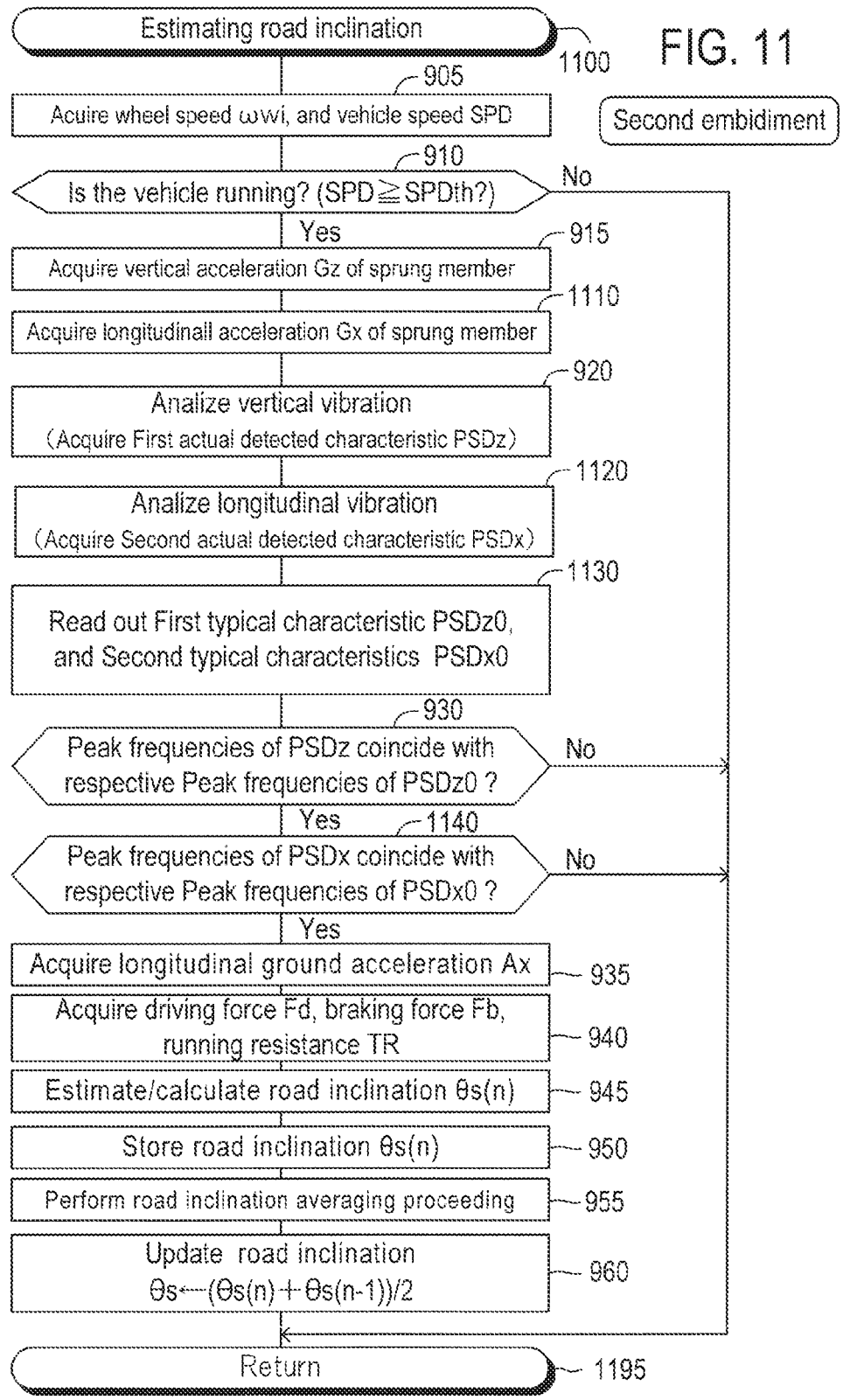

ROAD INCLINATION ESTIMATING APPARATUS OF VEHICLE

CROSS REFERENCE TO RELATED APPLICATIONS

This nonprovisional application claims priority to Japanese Patent Application No. 2019-088183 filed with the Japan Patent Office on May 8, 2019, the entire contents of which are hereby incorporated by reference.

TECHNICAL FIELD

The present disclosure relates to an apparatus configured to estimate an inclination/gradient of a road (or a road surface) on which a vehicle is running.

BACKGROUND

There have been known apparatuses configured to estimate an inclination/gradient of a road on which a vehicle is running. Hereinafter, the inclination of the road may sometimes referred to as a "road inclination (or road inclination/gradient angle)".

One of such apparatuses is disclosed in Japanese Patent Application Laid-Open (kokai) No. 2008-185418 (see. FIG. 5). The disclosed apparatus, referred to as a "first conventional apparatus", is configured to estimate/extrapolate the road inclination based on a longitudinal acceleration (fort-rear acceleration) of a sprung mass of a vehicle, a lateral acceleration of a vehicle, a slip angle, a pitch angle, and a rolling angle.

SUMMARY

The longitudinal acceleration and the lateral acceleration vary depending on not only a component due to the road inclination but also a disturbance which includes a component caused by a surface of the road (road surface). Thus, it is not easy for the first conventional apparatus to accurately estimate the road inclination based on parameters including the longitudinal acceleration and the lateral acceleration, that are detected while the vehicle is running. Another conventional apparatus (referred to as a "second conventional apparatus") for estimating the road inclination is disclosed in Japanese Patent Application Laid-Open (kokai) No. 2010-241265 (see. FIG. 5). The second conventional apparatus stops estimating the road inclination when it determines that a reliability in estimating the road inclination is low while the vehicle is braking. However, the second conventional apparatus is based on the premise of braking of the vehicle for estimating the road inclination. Therefore, there is a room for improvement on how to estimate the road inclination.

The present disclosure is made to cope with the above problems. One of the objects of the present disclosure is to provide a road inclination estimating apparatus of a vehicle configured to estimate the road inclination with high accuracy while eliminating the influence of the disturbance as much as possible.

In view of the above, a road inclination estimating apparatus (hereinafter, simply referred to as a "present disclosed apparatus") of a vehicle (10) according to the present disclosure comprises a wheel speed sensor speed (53) configured to generate a signal indicative of a wheel speed (ωwi), an acceleration sensor (51) configured to generate a signal indicative of a vertical acceleration (Gz) of a sprung mass (11) of the vehicle, and an electronic unit (50, 40) that includes a longitudinal ground acceleration acquiring section, a braking and driving force acquiring section, a vertical vibration analysis section, and an estimating section.

The electronic unit is configured to:
acquire the wheel speed (ωwi) (step 905, corresponding to a wheel speed obtaining section);
acquire a longitudinal ground acceleration (Ax) of the vehicle based on the wheel speed (step 935, corresponding to the longitudinal ground acceleration acquiring section);
acquire a driving force (Fd) generated by a driving device (20) of the vehicle and a braking force (Fb) generated by a braking device (30) of the vehicle (step 940, corresponding to the braking and driving force acquiring section); and
perform a frequency analysis of a vertical vibration of the sprung mass based on the vertical acceleration (Gz) represented by the signal generated by the acceleration sensor (51) to acquire peak frequencies of the vertical vibration (step 920, corresponding to the vertical vibration analysis section). In some embodiments, the electronic unit is configured to acquire the power spectrum density characteristic (PSDz) of the vertical vibration with respect to frequency based on the vertical acceleration (Gz) so as to acquire the peak frequencies of the vertical vibration.

The electronic unit is further configured to:
determine whether or not a first estimation condition (condition (1)) is satisfied, the first estimation condition being satisfied when the acquired peak frequencies of the vertical vibration are within respective frequency ranges (Δf1, Δf2) that include respective natural peak frequencies (f1, f2) of the vertical vibration being inherent for the vehicle and acquired in advance (step 930); and
estimate the road inclination (θs) based on parameters including the longitudinal ground acceleration (Ax), the driving force (Fd), and the braking force (Fb) (and a running resistance (TR) obtained based on a vehicle speed) when it is determined that an estimation allowable condition is satisfied, the estimation allowable condition being satisfied when the first estimation condition is determined to be satisfied (step 930: Yes, step 945 to step 960 corresponding to the estimating section).

In other words, one of embodiments of the electronic unit is configured to:
acquire power spectrum density characteristic (PSDz) of the vertical vibration with respect to frequency as a result of the frequency analysis of the vertical vibration (step 920); and
determine that the first estimation condition is satisfied (step 930: Yes), when the power spectrum density characteristic (PSDz) of the vertical vibration has two of the acquired peak frequencies of the vertical vibration, wherein, one of the two of the peak frequencies of the vertical vibration is within a first frequency range (Δf1) that includes a first peak frequency (f1) that is one of the natural peak frequencies of the vertical vibration, and the other one of the two of the peak frequencies of the vertical vibration is within a second frequency range (Δf2) that includes a second peak frequency (f2) that is another one of the natural peak frequencies of the vertical vibration, and the second peak frequency is higher than the first peak frequency.

In contrast, the electronic unit is further configured to stop estimating the road inclination (θs) when it is determined that the estimation allowable condition is not satisfied (step 930: No).

In other words, the electronic unit is configured to stop/prohibit estimating the road inclination (θs), when the power spectrum density characteristic (PSDz) of the vertical vibration has two of the acquired peak frequencies of the vertical vibration that falls neither in the first frequency range (Δf1) nor in the second frequency range (Δf2).

The power spectrum density characteristic (PSDz0) of the vertical vibration with respect to frequency, obtained in advance under a specific running condition of the vehicle, has the first peak frequency (f1) that is one of the natural peak frequencies and the second peak frequency (f2) that is another of the natural peak frequencies. Meanwhile, when the vehicle is running on, for example, a road which is an asphalt-paved road but whose surface is rough/uneven, the wheels greatly/wildly move vertically, and thus, a relatively high frequency vibration caused by the vibration of the unsprung mass of the vehicle is transmitted to the sprung mass of the vehicle. This causes the actual peak frequency of the "power spectrum density (referred to as a "first actual detected characteristic (PSDz)") of the vertical vibration" to become higher than the first peak frequency (f1) being the natural peak frequency of the power spectrum density (referred to as a "first typical characteristic (PSDz0)") obtained in advance under the specific running condition of the vehicle.

In contrast, when the vehicle is running on, for example, a flat asphalt-paved road, the vibration of the unsprung mass of the vehicle is not great, and thus, does not greatly affect the vibration of the sprung mass. Therefore, the actual peak frequency of the first actual detected characteristic (PSDz) is substantially equal to (or coincides with) the first peak frequency (f1) being the natural peak frequency of the first typical characteristic (PSDz0).

In addition, when the vehicle is running on, for example, a road which is an asphalt-paved road but whose surface is rough/uneven, the wheel speed fluctuates greatly due to the disturbance caused by the rough surface (irregularities), and thus, the longitudinal ground acceleration calculated based on the wheel speed may include a large error.

Accordingly, the road inclination (θs) that is calculated using the longitudinal ground acceleration is not accurate when the vehicle is running on such a road. In this case, the peak frequency at a higher frequency side of the first actual detected characteristic (PSDz) is higher than the second peak frequency (f2) that is higher than the first peak frequency (f1) and is the natural peak frequency of the first typical characteristic PSDz0.

In view of the above, the present disclosed apparatus estimates the road inclination (θs) when the acquired peak frequencies of the vertical vibration are within respective frequency ranges that include respective natural peak frequencies of the vertical vibration, and stops estimating the road inclination (θs) when at least of of the acquired peak frequencies of the vertical vibration is not within any one of the frequency ranges. In other words, the present disclosed apparatus stops/prohibits estimating the road inclination (θs) when disturbance is likely to be occurring that degrades the accuracy of the longitudinal ground acceleration (Ax) and thus the accuracy of the estimation of the the road inclination (θs), and estimates the road inclination (θs) when such disturbance is not likely to be occurring. Consequently, the present disclosed apparatus can estimate the road inclination (θs) with a high degree of accuracy.

As understood from the above, it can be said that one of embodiments of the estimating section of the present disclosed apparatus is configured to estimate the road inclination (θs), when "the first actual detected characteristic (PSDz) of the vertical vibration of the sprung mass" has the two peak frequencies, one of them being within the first frequency range (Δf1) and the other of them being within the second frequency range (Δf2), wherein the first frequency range Δf1 is a range that includes "the first peak frequency (f1) that is one of the natural frequencies of the vehicle" that "the first typical characteristic (PSDz0) of the vertical vibration of the sprung mass" has, and the second frequency range (Δf2) is a range that includes "the second peak frequency (f2) that is another of the natural frequencies of the vehicle 10" that the first typical characteristic (PSDz0). The second peak frequency (f2) is higher than the first peak frequency (f1).

Furthermore, it can be said that the estimating section of the present disclosed apparatus is configured to stop estimating the road inclination (θs), when the first actual detected characteristic (PSDz) has the peak frequency that falls neither in the first frequency range (Δf1) nor in the second frequency range (Δf2).

In a vehicle model of the vehicle to which the present disclosed apparatus is applied, a vehicle body of the vehicle is equivalently supported by a front spring and a rear spring. Thus, the vehicle tends to bounce and pitch, easily. This is why the first typical characteristic (PSDz0) has two of the peak frequencies (f1, f2) that are the natural frequencies.

It can also be said that the estimating section of the present disclosed apparatus is configured to estimate the road inclination (θs), when the first actual detected characteristic (PSDz) has two peak frequencies, one of them being within the first frequency range (Δf1) so as to be substantially equal to the first peak frequencies (f1), and the other of them being within the second frequency range (Δf2) so as to be substantially equal to the second peak frequencies (f2).

For instance, when the vehicle is running on a road that is an asphalt-paved road but whose surface is rough/uneven, the peak frequency at the higher frequency side of the first actual detected characteristic is likely to be higher than the natural peak frequency that is higher among the tow peak frequencies of the first typical characteristic. Further, when the vehicle is running on a rough road that is not paved, the unsprung mass of the vehicle vertically moves greatly and/or tilts greatly. Thus, in this case, the peak frequency at the higher frequency side of the first actual detected characteristic is likely to be higher than the natural peak frequency that is higher among the tow peak frequencies of the first typical characteristic, and in addition, the peak frequency at the lower frequency side of the first actual detected characteristic is likely to be higher than the natural peak frequency that is lower among the two peak frequencies of the first typical characteristic.

In view of the above, it can also be understood that the present disclosed apparatus described above can estimate the road inclination (θs) with a high degree of accuracy.

One embodiment of the present disclosed apparatus further comprises an acceleration sensor (51) configured to generate a signal indicative of a longitudinal acceleration (Gx) of the sprung mass of the vehicle. The electronic unit of this embodiment of the present disclosed apparatus is configured to perform a frequency analysis of a longitudinal vibration of the sprung mass based on the longitudinal acceleration (Gx) represented by the signal generated by the acceleration sensor to acquire peak frequencies of the longitudinal vibration.

The above electronic unit of this embodiment of the present disclosed apparatus is further configured to:

determine whether or not a second estimation condition is satisfied, the second estimation condition being satisfied when the acquired peak frequencies of the longitudinal vibration are within respective frequency ranges ($\Delta f3$, $\Delta f4$) that include respective natural peak frequencies (f3, f4) of the longitudinal vibration being inherent for the vehicle and acquired in advance (step 1140); and determine that the estimation allowable condition is satisfied, when both of the above described first estimation condition and the second estimation condition are determined to be satisfied (step 930 in FIG. 11: Yes, and step 1140 in FIG. 11: Yes).

The above electronic unit of this present disclosed apparatus may be configured to:

acquire power spectrum density characteristic (PSDx) of the longitudinal vibration as a result of the frequency analysis of the longitudinal vibration; and determine that the second estimation condition is satisfied, when the power spectrum density characteristic (PSDx) of the longitudinal vibration has two of the acquired peak frequencies of the longitudinal vibration, wherein, one of the two of the peak frequencies of the longitudinal vibration is within a third frequency range ($\Delta f3$) that includes a third peak frequency (f3) that is one of the natural peak frequencies of the longitudinal vibration, and the other one of the two of the peak frequencies of the longitudinal vibration is within a fourth frequency range ($\Delta f4$) that includes a fourth peak frequency (f4) that is another one of the natural peak frequencies of the longitudinal vibration, and the fourth peak frequency is higher than the third peak frequency.

In other words, the electronic unit is configured to stop/prohibit estimating the road inclination ($\theta s$), not only when the power spectrum density characteristic (PSDz) of the vertical vibration has two of the acquired peak frequencies of the vertical vibration wherein at least one of the acquired peak frequencies of the vertical vibration falls neither in the first frequency range ($\Delta f1$) nor in the second frequency range ($\Delta f2$), but also when the power spectrum density characteristic (PSDx) of the longitudinal vibration has two of the acquired peak frequencies of the longitudinal vibration wherein at least one of the acquired peak frequencies of the longitudinal vibration falls neither in the third frequency range ($\Delta f3$) nor in the fourth frequency range ($\Delta f4$).

Typically, the longitudinal acceleration of the sprung mass of the vehicle varies due to the bouncing and/or pitching of the vehicle. Thus, not only the vertical vibration of the sprung mass but also the longitudinal vibration of the sprung mass may be considered when determining whether or not the estimation allowable condition is satisfied.

In view of the above, it can also be understood that the embodiment of the present disclosed apparatus described above can estimate the road inclination ($\theta s$) with a higher degree of accuracy, since it estimates the road inclination ($\theta s$) in a state where the disturbance is more unlikely to affects the estimation result of the road inclination ($\theta s$).

Notably, in the above description, in order to facilitate understanding of the present disclosure, the constituent elements or parameters of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

BRIEF DESCRIPTION OF THE DRAWINGS

FIG. 9 is a flowchart representing an "estimation of a road inclination routine" executed by a CPU of the brake ECU shown in FIG. 1;

FIG. 11 is a flowchart representing an "estimation of a road inclination routine" executed by a CPU of the brake ECU according to a second embodiment of the present disclosure.

DETAILED DESCRIPTION

First Embodiment (Configuration)

Figure 1:
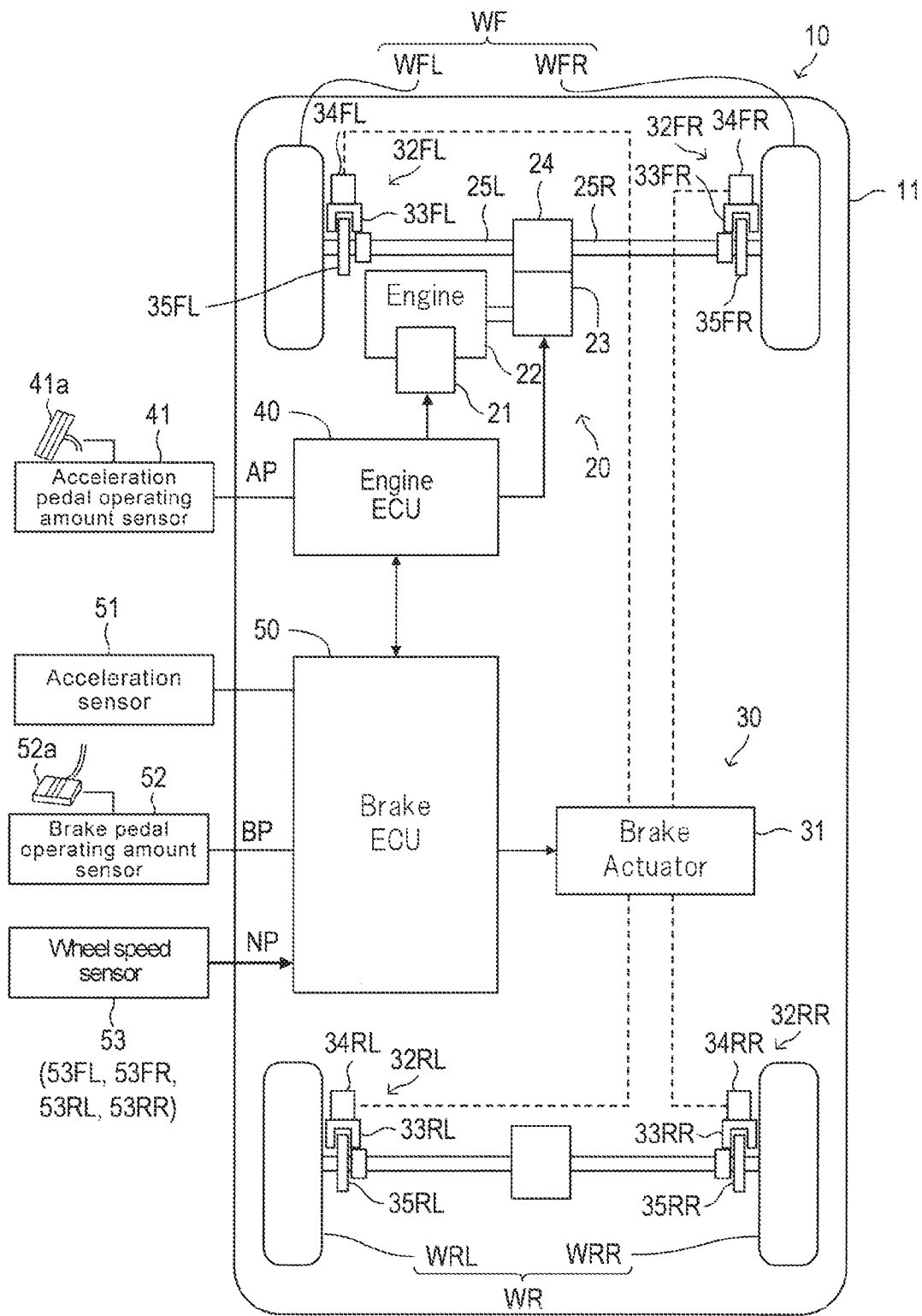
FIG. 1 is a schematic diagram of a vehicle to which a road inclination estimating apparatus according to a first embodiment of the present disclosure is applied.

A road inclination estimating apparatus (hereinafter, referred to as a "first apparatus") of a vehicle according to a first embodiment of the present disclosure is applied to a vehicle 10 shown in FIG. 1.

The vehicle 10 has a driving device 20, a braking device 30, an engine ECU 40, and a brake ECU 50.

The driving device 20 includes an engine actuator 21, an engine 22, and a transmission 23. The engine actuator 21 is well known and includes a fuel supply device having injectors, an ignition device having ignition plugs, a throttle valve opening actuator, and a variable valve timing control device for controlling an amount of intake air. The engine 22 is a 4-cycle spark-ignition type multi-cylinder internal combustion engine. A driving force Fd generated by the driving device 20 is transferred to a front left wheel WFL via a front differential 24 and a front left axle 25L, and is also transferred to a front right wheel WFR via the front differential 24 and a front right axle 25R.

The braking device 30 includes a brake actuator 31 and friction based braking-mechanisms 32FL, 32FR, 32RL, and 32RR. It should be noted that, in the present specification, for an element provided for each of the wheels, one of a suffix FL for representing the front left wheel WFL, a suffix FR for representing the front right wheel WFR, a suffix RL for representing the rear left wheel WRL, and a suffix RR for representing the rear right wheel WRR is attached to the end of the reference numeral of the element. The suffix is omitted when the position of the wheel is not specified for the element provided for each of the wheels.

The brake actuator 31 is provided between an unillustrated master cylinder configured to compress operating fluid (brake oil) with a depression force of the brake pedal 52a and the friction based brake mechanisms 32, each provided at the front left wheel WFL, the front right wheel WFR, the rear left wheel WRL, and the rear right wheel WRR. The brake actuator 31 includes an unillustrated reservoir, an unillustrated oil pump, and unillustrated various valves. The brake actuator 31 applies a hydraulic pressure (braking pressure) of the operating fluid to a wheel cylinder 34 which is built in the brake caliper 33 of the friction based brake mechanism 32. The wheel cylinder 34 works due to the hydraulic pressure to thereby press an unillustrated brake pad onto the brake disc 35. Thereby, a braking force (frictional braking force) Fb is generated.

The engine ECU 40 is connected with the brake ECU 50 via a CAN (controller area network) communication system so as to be able to mutually transmit and receive information to/from the brake ECU 50. The ECU is an abbreviation of an "Electronic Control Unit" which is a controller. The ECU is an electronic circuit/unit including, as a main component, a microcomputer having a CPU, a ROM, a RAM, a back-up RAM (or a nonvolatile memory) and an interface I/F. The CPU achieves various functions described later through executing instructions (routines) stored in the memory (ROM). The engine ECU 40 and the brake ECU 50 may be integrated into a single ECU.

The engine ECU 40 is electrically connected to the engine actuator 21, the transmission 23, and the like. The engine ECU 40 is configured to vary the driving force Fd by controlling a fuel injection amount from the injectors, a fuel injection timing, a spark timing of the ignition device, open-close timings of the intake and exhaust valves, and a transmission stage of the transmission. In addition, the engine ECU 40 is electrically connected to an acceleration pedal operating amount sensor 41 and unillustrated engine condition detection sensors, so as to receive from the connected sensors, output signals indicative of engine operating conditions (e.g., an engine rotational speed NE, an acceleration pedal operating amount AP of an acceleration pedal 41a operated by a driver of the vehicle 10). The engine ECU 40 calculates an required driving torque based on the signals from the engine condition detection sensors and the acceleration pedal operating amount sensor 41. The engine ECU 40 determines, based on the required driving torque, the fuel injection amount, the fuel injection timing, the ignition timing, and the open-close timings of the intake and exhaust valves.

The brake ECU 50 is electrically connected to an acceleration sensor 51, a brake pedal operation amount sensor 52, wheel speed sensors 53, or the like, so as to receive output signals from the connected sensors. The acceleration sensor 51 is fixed to a vehicle body 11 which is a sprung mass of the vehicle 10. The acceleration sensor 51 is configured to generate an output signal indicative of a longitudinal acceleration (front-rear acceleration) Gx of the vehicle body 11, and an output signal indicative of a vertical acceleration Gz of the vehicle body 11. The acceleration sensor 51 may include two separate sensors, wherein, one of the sensors is configured to generate the output signal indicative of the longitudinal acceleration Gx, and the other of the sensors is configured to generate the output signal indicative of the vertical acceleration Gz.

The brake pedal operation amount sensor 52 is configured to generate an output signal indicative of a brake pedal operating amount BP which is an operating amount of the brake pedal 52a operated by the driver. The wheel speed sensors 53 (53FL, 53FR, 53RL, and 53 RR) are configured to generate output signals indicative of wheel rotational speeds NP of the front left wheel WFL, the front right wheel WFR, the rear left wheel WRL, and the rear right wheel WRR, respectively. The brake ECU 50 is configured to calculate/acquire the wheel speed $\omega wi$ (i=fl, fr, rl, or rr) of each of the wheels based on the signal indicative of the wheel rotational speed NP of each wheels and a predetermined tire radius (which is "1" for convenience sake in the present example). Note that, the wheel speed $\omega wfl$ is a longitudinal ground wheel speed of the front left wheel WFL, the wheel speed $\omega wfr$ is a longitudinal ground wheel speed of the front right wheel WFR, the wheel speed $\omega wrl$ is a longitudinal ground wheel speed of the rear left wheel WRL, and the wheel speed $\omega wrr$ is a longitudinal ground wheel speed of the rear right wheel WFR.

The brake ECU 50 is configured to calculate/acquire a vehicle speed SPD and a wheel acceleration (i.e., a differential value of the wheel speed $\omega wi$ with respect to time), based on the calculated wheel speeds $\omega wi$ (i=fl, fr, rl, and rr). The brake ECU 50 is configured to average the wheel accelerations of the wheels to acquire a longitudinal ground acceleration Ax (acceleration Ax with respect to the ground in a front-rear direction) of the vehicle 10. Furthermore, as described later in detail, the brake ECU 50 is configured to calculate/acquire the road inclination (gradient angle of the road) $\theta s$ based on a motion equation using the calculated longitudinal ground acceleration Ax (refer to an equation (1)).

The brake ECU 50 is configured to calculate, based on the brake pedal operation amount BP, a target brake force Fbtfl of the front left wheel WFL, a target brake force Fbtfr of the front right wheel WFR, a target brake force Fbtrl of the rear left wheel WRL, and a target brake force Fbtrr of the rear right wheel WRR. In addition, the brake ECU 50 is configured to control/adjust the braking pressure of the operating fluid supplied to each of the wheel cylinders 34FL, 34FR, 34RL, and 34RR in such a manner that actual braking forces of the wheels become equal to respective target brake forces.

(Outline of Operation)

The road inclination θs and/or a change in the road inclination θs affect a cruise control, and a start and stop control of the vehicle 10, for instance. Thus, the road inclination θs may be estimated (updated) accurately and may be used in determining a control amount for a driving force and/or a braking force of the vehicle 10. The first apparatus utilizes the estimated road inclination θs for controlling the vehicle 10.

Meanwhile, a disturbance (running disturbing resistance) such as vibration input to the vehicle 10 caused by a posture change of the vehicle 10 (e.g., bouncing, pitching) and irregularities (unevenness) of a road surface affects/fluctuates the wheel speed(s) ωwi, and thus, affects the longitudinal ground acceleration Ax calculated as described later in detail. Therefore, depending on the running/traveling circumstance (i.e., condition of the road surface) of the vehicle 10, the road inclination θs may not be accurately estimated/calculated based on the motion equation (refer to an equation (1)) using the longitudinal ground acceleration Ax.

In view of the above, the first apparatus is configured to determine whether or not a current state is an undesirable state where the estimation of the road inclination θs may be greatly affected (namely, an estimation error of the road inclination θs may become large) by, for instance, a large posture change of the vehicle 10 and/or irregularities of the road surface, and is configured to prohibit/stop estimating the road inclination θs when the current state is determined to be the undesirable state. Accordingly, the estimated road inclination θs becomes more accurate.

More specifically, the first apparatus is configured to detect the vertical acceleration Gz of the sprung mass (i.e., vehicle body 11) using the acceleration sensor 51 fixed to the sprung mass of the vehicle 10, and to calculate/obtain frequency spectrum regarding vibration of the sprung mass based on the detected vertical acceleration Gz. The frequency spectrum is frequency characteristic of power spectrum density (PSD) of the vertical vibration represented by the signal generated by the acceleration sensor 51, and is obtained by performing frequency analysis of the vertical acceleration Gz. Hereinafter, the frequency characteristic of power spectrum density (PSD) of the vertical vibration while the vehicle 10 is running is referred to as "first actual detected characteristic (or value) PSDz".

Furthermore, the first apparatus is configured, before the vehicle 10 starts running on a public road (e.g., before factory shipment of the vehicle 10), to detect the vertical acceleration Gz as a typical vertical acceleration Gz0 in a state where there is no disturbance described above, to calculate/acquire frequency characteristic of power spectrum density (hereinafter, referred to as "first typical characteristic (or value) PSDz0") of vertical vibration represented by the typical vertical acceleration Gz0 that is represented by the signal generated by the acceleration sensor 51. For instance, the typical vertical acceleration Gz0 is acquired by detecting the vertical acceleration Gz while the vehicle is being vibrated on a shaking table (vibration test table). The first apparatus is configured to store the first typical characteristic PSDz0 in the ROM of the brake ECU 50 in advance.

The first apparatus is configured to calculate the road inclination θs (perform the calculation to estimate the road inclination θs) when the first actual detected characteristic PSDz has peak frequencies that are within respective frequency ranges including/covering respective peak frequencies that the first typical characteristic PSDz0 has. To the contrary, the first apparatus is configured to prohibit/stop calculating the road inclination θs (prohibit the calculation to estimate the road inclination θs) when the first actual detected characteristic PSDz has a peak frequency that is out of any one of the frequency ranges including/covering the peak frequencies that the first typical characteristic PSDz0 has. Hereinafter, a "state where the first actual detected characteristic PSDz has peak frequencies that are within respective frequency ranges including/covering respective peak frequencies that the first typical characteristic PSDz0 has" may be expressed as a "state (desirable/ideal state) where the peak frequencies of the first actual detected characteristic PSDz and the peak frequencies of the first typical characteristic PSDz0 coincide with (agree with) each other" or a "state where the peak frequencies of the first actual detected characteristic PSDz coincide with the respective peak frequencies of the first typical characteristic PSDz0".

(Specific Operation)

<The First Typical Characteristic>

Figure 2:
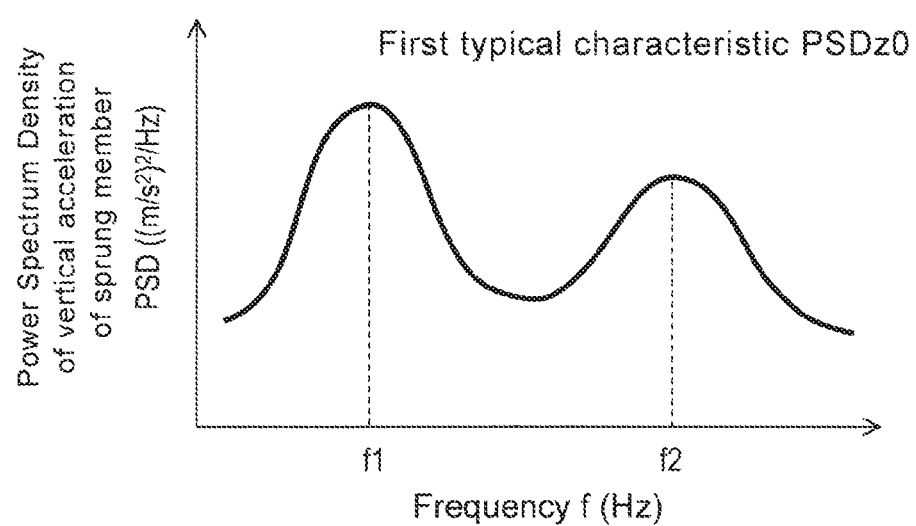
FIG. 2 is a graph showing frequency characteristic (first typical characteristic) of power spectrum density of vertical acceleration of a sprung mass.
Figure 3:
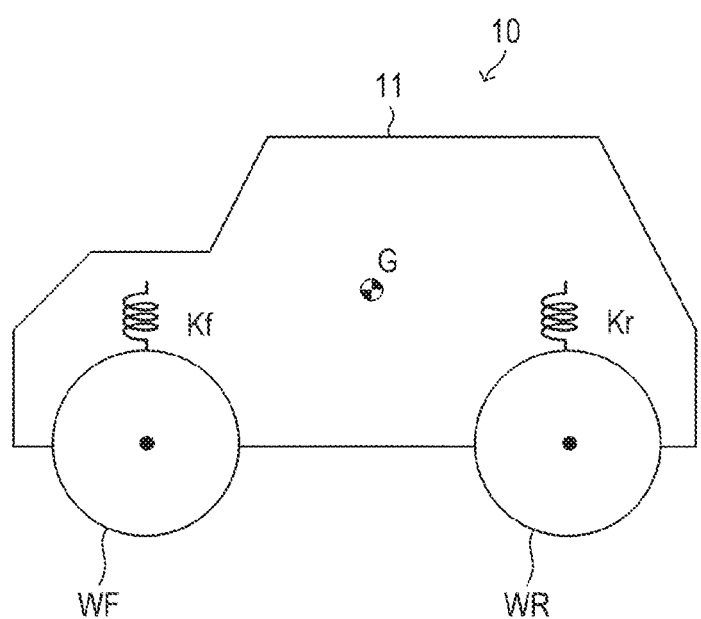
FIG. 3 is a view showing a vehicle model for the vehicle shown in FIG. 1.

Operations of the first apparatus will next be described in detail. As shown in FIG. 2, the first typical characteristic PSDz0 has two peak frequencies f1 and f2. Note that a peak frequency means a frequency at which the power spectrum density (PSD) is a local maximum value. The reason why the first typical characteristic PSDz0 has the two peak frequencies f1 and f2 is mainly because the vehicle body 11 is equivalently supported by a spring Kf and a spring Kr (refer to FIG. 3) that are provided at a front part and a rear part of the vehicle body 11, respectively. The vehicle body 11 moves/vibrates vertically owing to the front and rear springs Kf, Kr, or tilts in the longitudinal (front-rear) direction owing to the front and rear springs Kf, Kr. The vertical movement/vibration of the vehicle body 11 increases the power spectrum density at the peak frequency (hereinafter, referred to as a "first peak frequency") f1 at a lower frequency side. The tilting of the vehicle body 11 in the longitudinal direction increases the power spectrum density at a peak frequency (hereinafter, referred to as a "second peak frequency") f2 at a higher frequency side. The second peak frequency f2 is higher than the first peak frequency f1. For instance, in a typical passenger vehicle, the first peak frequency f1 is about 1 Hz, and the second peak frequency f2 is about 1.5 Hz. Each of the first peak frequency f1 and the second peak frequency f2 is referred to as a character frequency or a natural frequency that is inherent for the vehicle 10 depending on specifications of the vehicle 10 such as a position of the center of gravity G of the vehicle 10, a wheelbase of the vehicle 10, and a weight of the vehicle 10.

<The First Actual Detected Characteristic>

Figure 4A:
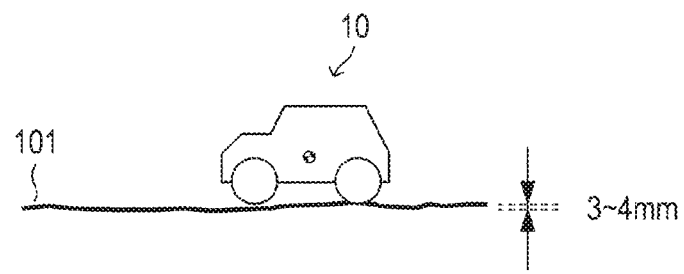
FIG. 4A is a view showing the vehicle is running on a flat smooth road.
Figure 4B:
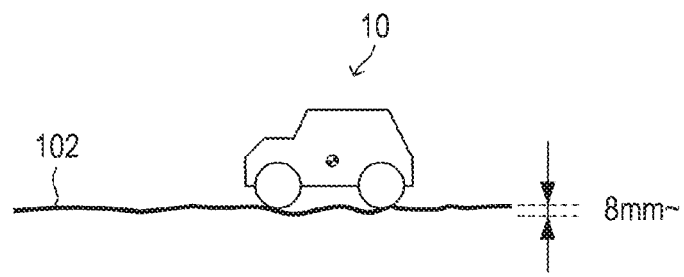
FIG. 4B is a view showing the vehicle running on an asphalt-paved road whose surface is rough.
Figure 5A:
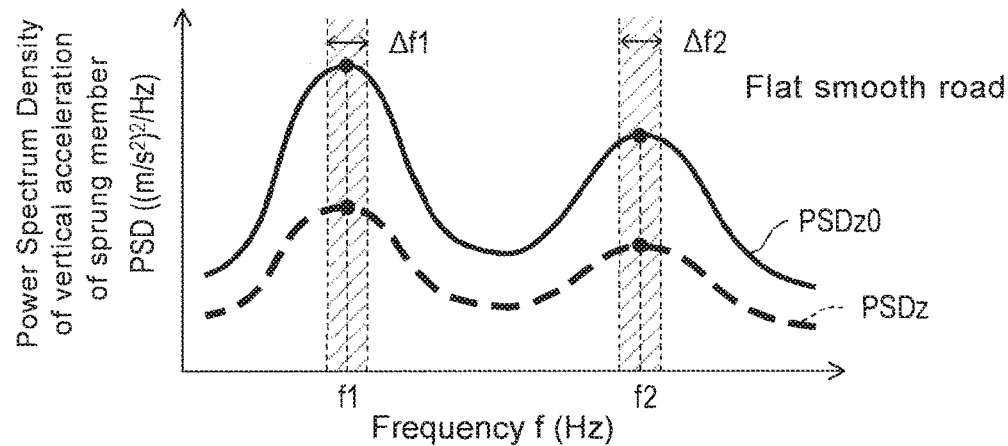
FIG. 5A is a graph showing a relationship between detected frequency characteristic of power spectrum density (first detected characteristic) of vertical acceleration of the sprung mass and pre-acquired frequency characteristic of power spectrum density (first typical characteristic) of vertical acceleration of the sprung mass corresponding to a case where the vehicle is running on the flat smooth road.

The first actual detected characteristic PSDz calculated when the vehicle 10 is running on, for example, a flat asphalt-paved road (hereinafter, referred to as a "flat smooth road", refer to FIG. 4A) 101 has two peak frequencies that are roughly equal to the first peak frequency f1 and the second peak frequency f2, respectively, as represented by broken lines shown in FIG. 5A. When the vehicle 10 is running on the flat smooth road, the disturbance caused by a large posture change of the vehicle 10 and/or irregularities of the road surface is very small. In addition, when the vehicle 10 is running on the flat smooth road, "the influence of the vibration of the vehicle 10 caused by the irregularities of the road surface" on the longitudinal ground acceleration Ax that is used for the estimation of the road inclination θs is negligibly small. Thus, an error of the road inclination θs estimated when the vehicle 10 is running on the flat smooth road is small. Notably, the vertical displacement of the flat smooth road is about ±2 mm, for instance.

Figure 4C:
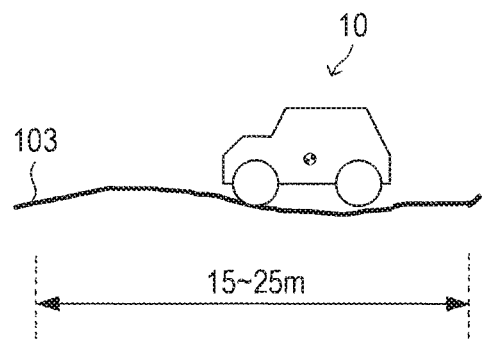
FIG. 4C is a view showing the vehicle running on an undulate paved road.
Figure 5B:
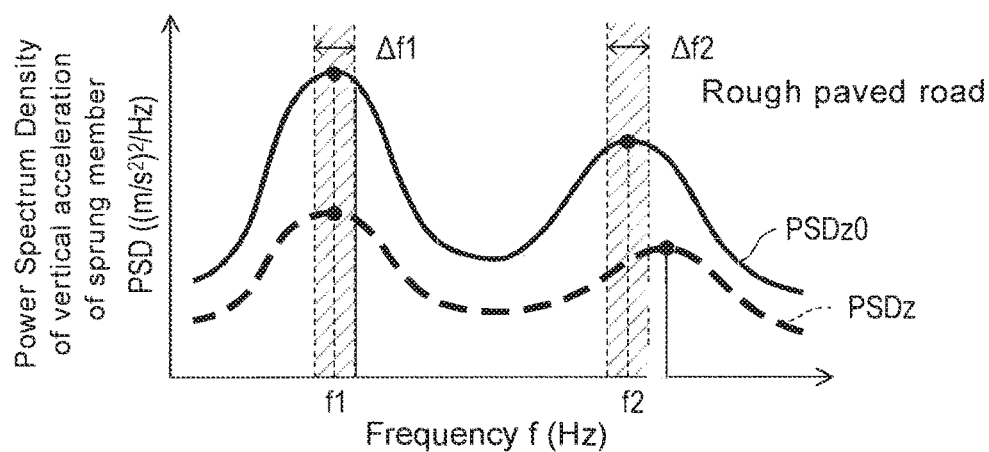
FIG. 5B is a graph showing a relationship between detected frequency characteristic of power spectrum density (first detected characteristic) of vertical acceleration of the sprung mass and pre-acquired frequency characteristic of power spectrum density (first typical characteristic) of vertical acceleration of the sprung mass corresponding to a case where the vehicle is running on the asphalt-paved road whose surface is rough
Figure 5C:
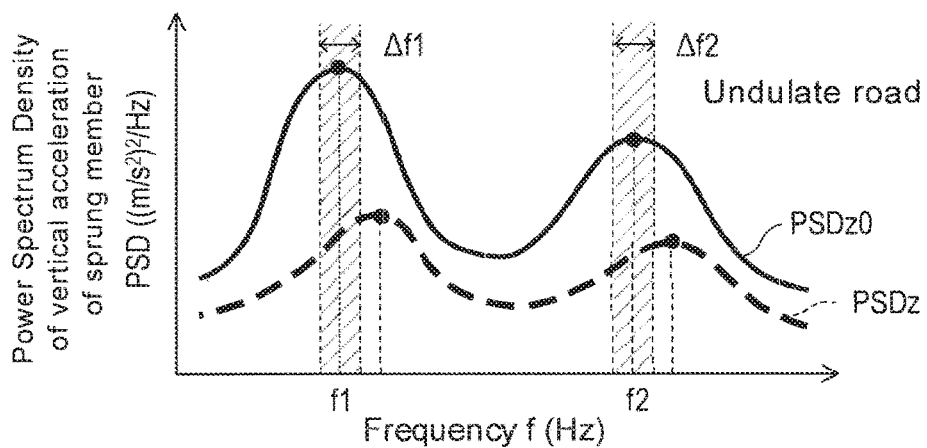
FIG. 5C is a graph showing a relationship between detected frequency characteristic of power spectrum density (first detected characteristic) of vertical acceleration of the sprung mass and pre-acquired frequency characteristic of power spectrum density (first typical characteristic) of vertical acceleration of the sprung mass corresponding to a case where the vehicle is running on the undulate paved road.

On one hand, the first actual detected characteristic PSDz calculated when the vehicle 10 is running on, for example, a road which is an asphalt-paved road but whose surface is rough/uneven (hereinafter, referred to as a "rough paved road", refer to FIG. 4C) 102 has a peak frequency that is approximately equal to the first peak frequency f1, as represented by a broken line shown in FIG. 5B. On the other hand, a peak frequency at a higher frequency side of the first actual detected characteristic PSDz thus calculated is higher than the second peak frequency f2 of the first typical characteristic PSDz, as represented by another broken line shown in FIG. 5B. This is because the influence of the relatively high frequency vertical vibration/movement of the unsprung mass on the output signal of the acceleration sensor 51 is too large to be negligible. Thus, "the influence of the vibration of the vehicle 10 (or vehicle body 11) due to the road surface" on the longitudinal ground acceleration Ax is large and cannot be negligible. In other words, an error of the road inclination θs estimated in this case is large. Notably, the vertical displacement of the rough paved road is about ±5 mm, for instance.

Meanwhile, the first actual detected characteristic PSDz calculated when the vehicle 10 is running on, for example, a road which is smooth but is undulate at intervals/in a cyclic manner (hereinafter, referred to as a "undulate road", refer to FIG. 4C) 103 has two peak frequencies, each of which is neither equal to the first peak frequency f1 nor equal to the second peak frequency f2. Specifically, the peak frequency at a lower frequency side of the first actual detected characteristic PSDz thus calculated is higher than the first peak frequency f1. This is probably because the vibration of the sprung mass caused by a large bouncing and the vibration of the sprung mass caused by a large pitching occur mixedly. The peak frequency at a higher frequency side of the first actual detected characteristic PSDz thus calculated is higher than the second peak frequency f2. This may be partly because the high frequency vertical vibration of the unsprung mass affects the output signal of the acceleration sensor 51. Thus, "the influence of the vibration of the vehicle 10 (or vehicle body 11) due to the road surface" on the longitudinal ground acceleration Ax is large and cannot be negligible. In other words, an error of the road inclination θs estimated in this case is large. Notably, the interval of the undulate road is about 20 m, for instance.

In view of the above, the first apparatus is configured to calculate/estimate the road inclination θs (namely, is configured to perform the calculation to estimate the road inclination θs), when an "estimation allowable condition for the first apparatus" which is a first estimation condition is determined to be satisfied. The first estimation condition is determined to be satisfied when a condition (1) described below and a condition (2) described below are both satisfied.

Condition (1): One of the two peak frequencies that the first actual detected characteristic PSDz has is within a first frequency range Δf1 that includes the first peak frequency f1 that the first typical characteristic PSDz0 has.

Condition (2): The other one of the two peak frequencies that the first actual detected characteristic PSDz has is within a second frequency range Δf2 that includes the second peak frequency f2 that the first typical characteristic PSDz0 has.

In contrast, the first apparatus is configured to prohibit/stop calculating/estimating the road inclination θs (namely, is configured not to perform the calculation to estimate the road inclination θs), when at least one of the condition (1) and the condition (2) is not satisfied.

It should be noted the numerical values for the vertical displacement of the road and the interval of the undulate road are exemplary, and the first apparatus should not be limited by those numerical values.

<Calculation for Estimating the Road Inclination θs>

Figure 6:
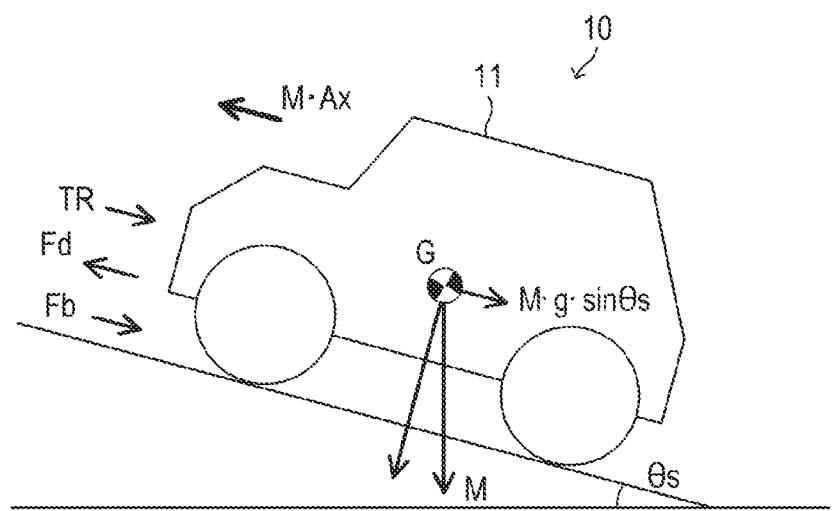
FIG. 6 is a side view of a vehicle running on a slope with forces acting on the vehicle.

The calculation for estimating the road inclination θs will next be described in detail. The motion equation (1) described below is satisfied when the vehicle 10 is running on (climbing up) a slope having a road inclination (road gradient angle) θs as shown in FIG. 6. "M" is a weight of the vehicle 10, "TR" is a running resistance, and "g" is acceleration of gravity. "Fd" is a driving force, and "Fb" is a braking force.

$$M \cdot Ax = Fd + Fb - TR - M \cdot g \cdot \sin \theta s \quad (1)$$

An equation (2) described below is obtained from the equation (1)

$$\theta s = \sin^{-1}[(-M \cdot Ax + Fd + Fb - TR)/(M \cdot g)] \quad (2)$$

The longitudinal ground acceleration Ax is defined to assume/be a positive value when the direction of the longitudinal ground acceleration Ax is the same as the direction of the driving force Fd (which is positive). The driving force Fd is obtained based on the required torque calculated by the engine ECU 40. The braking force Fb (which is negative) is a sum of the target brake force Fbtfl of the front left wheel WFL, the target brake force Fbtfr of the front right wheel WFR, the target brake force Fbtrl of the rear left wheel WRL, and the target brake force Fbtrr of the rear right wheel WRR. As described above, the brake forces (Fbtfl, Fbtfr, Fbtrl, and Fbtrr) are calculated by the brake ECU 50. The road inclination θs is defined to assume/be a positive value when the vehicle is ascending (climbing up) the slope.

The longitudinal ground acceleration Ax is calculated based on the wheel speeds ωwi (i=fl, fr, rl, and rr), using an equation (3) described below.

$$Ax = [(\omega wfl(n) - \omega wfl(n-1))/\Delta t + (\omega wfr(n) - \omega wfr(n-1))/\Delta t + (\omega wrl(n) - \omega wrl(n-1))/\Delta t + (\omega wrr(n) - \omega wrr(n-1))/\Delta t]/4 \quad (3)$$

Note that "Δt" is a calculation period of time, ωwi(n) is the wheel speed obtained at the present time point (i.e., the newest/current wheel speed), and ωwi(n−1) is the wheel speed obtained at a time point the calculation period of time Δt before the present time point (i.e., the previous wheel speed).

Figure 7:
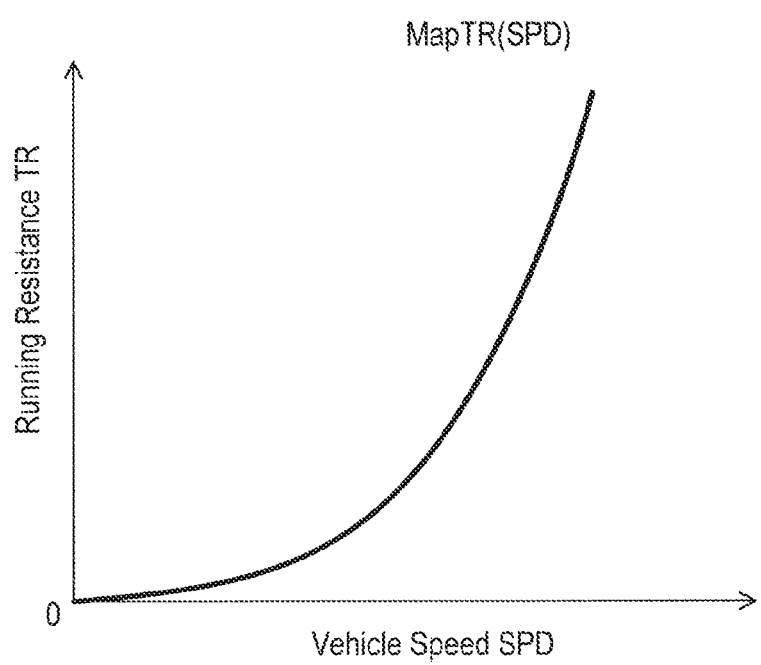
FIG. 7 is a graph showing a relationship between a vehicle speed and a running resistance.

The running resistance TR includes the rolling resistance of each of the wheels, the air resistance, and the like. According to the experiments, the running resistance TR varies depending on the vehicle speed SPD. As shown in FIG. 7, the running resistance TR becomes larger as the vehicle speed SPD becomes higher. Thus, the running resistance TR is acquired/calculated by applying the detected/acquired vehicle speed SPD to a look-up table MapTR(SPD) shown in FIG. 7. The look-up table MapTR(SPD) defines a relationship between the wheel speed and the running resistance TR. The look-up table MapTR(SPD) is produced based on the experiments or the like, and has been stored in the ROM/memory of the brake ECU 50. In the manner described the above, the road inclination θs is calculated using the above equation (2).

Figure 8A:
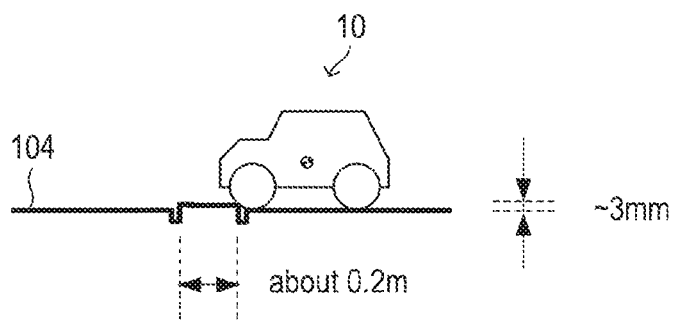
FIG. 8A is a view showing the vehicle running on a road with a projected joint.

Another cases where the estimation of the road inclination θs should be prohibited/avoided will next be described. For instance, as shown in FIG. 8A, it is assumed that the vehicle 10 is running on a road 104. A joint having a length of about 0.2 m is projected by a height of 3 mm from the road surface of the road 104. When the vehicle passes through the joint, a relatively large force is applied to (input) the unsprung mass of the vehicle 10. In this case, the first actual detected characteristic PSDz is similar to the first actual detected characteristic PSDz shown in FIG. 5B. Namely, the first actual detected characteristic PSDz observed when the vehicle 10 is passing through the joint of the road 104 is similar to the first actual detected characteristic PSDz observed when the vehicle 10 is running on the rough paved road 102.

Figure 8B:
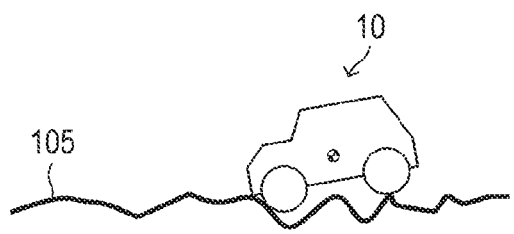
FIG. 8B is a view showing the vehicle running on a rough road.

As shown in FIG. 8B, when the vehicle 10 is running on a rough road 105 such as a road that is not paved, a large force is input/applied to the unsprung mass of the vehicle 10, and the vehicle 10 vertically moves greatly and/or tilts greatly in the longitudinal direction. The first actual detected characteristic PSDz in this case is similar to the first actual detected characteristic PSDz shown in FIG. 5A. Namely, the first actual detected characteristic PSDz observed when the vehicle 10 is running on the rough road 105 is similar to the first actual detected characteristic PSDz observed when the vehicle 10 is running on the undulate road 103.

(Specific Operation)
<Estimation of the Road Inclination θs>

Next, specific operation of the first apparatus will next be described. The CPU of the brake ECU 50 (hereinafter, simply referred to as the "CPU") is configured to execute an "estimation of the road inclination routine" represented by a flowchart shown in FIG. 9, every time a predetermined constant time elapses.

The CPU starts processing from step 900 at an appropriate timing and proceeds to step 905 so as to acquire the wheel speeds ωwi (i=fl, fr, rl, and rr) of each of the wheels and calculate the vehicle speed SPD (speed of the vehicle 10) based on the acquired wheel speeds ωwi. In this case, the CPU calculates, as the wheel speed SPD, an average of the wheel speeds ωwi (i=fl, fr, rl, and rr) (i.e., SPD=(ωwfl+ωwfr+ωwrl+ωwrr)/4).

Next, the CPU proceeds to step 910 to determine whether or not the vehicle speed SPD is equal to or higher than a predetermined speed SPDth higher than zero. In other words, the CPU determines whether or not the vehicle 10 is running. When the vehicle speed SPD is lower than the predetermined speed SPDth, the CPU makes a "No" determination at step 910 and directly proceeds to step 995 to terminate the present routine tentatively. Thus, in this case, the road inclination θs is not estimated.

Meanwhile, when the vehicle speed SPD is equal to or higher than the predetermined speed SPDth, the CPU makes a "Yes" determination at step 910 and proceeds to step 915 to 925 described below.

Step 915: the CPU acquires/obtains the vertical acceleration Gz of the sprung mass from the acceleration sensor 51.

Step 920: the CPU performs analysis (hereinafter, referred to as a "PSD analysis") of the power spectrum density (PSD) using the vertical vibration based on the vertical acceleration Gz, and obtains the result of the PSD analysis as the first actual detected characteristic PSDz.

Step 925: the CPU reads out the first typical characteristic PSDz0 from the ROM of the brake ECU 50. The first typical characteristic PSDz0 was obtained beforehand and has been stored in the ROM. Alternatively, the CPU may read out the first peak frequency f1, and the second peak frequency f2 from the ROM. Further alternatively, the CPU may read out the first frequency range Δf1, and the second frequency range Δf2 from the ROM.

Subsequently, the CPU proceeds to step 930 and determines whether or not each of the peak frequencies of the first actual detected characteristic PSDz and each of the respective peak frequencies of the first typical characteristic PSDz0 coincides with each other. In other words, the CPU determines whether or not the lower peak frequency of the first actual detected characteristic PSDz is within the first frequency range Δf1 and the higher peak frequency of the first actual detected characteristic PSDz is within the second frequency range Δf2. When each of the peak frequencies of the first actual detected characteristic PSDz and each of the respective peak frequencies of the first typical characteristic PSDz0 does not coincide with each other, the CPU makes a "No" determination at step 930 and directly proceeds to step 995 to terminate the present routine tentatively. Thus, in this case, the road inclination θs is not estimated.

In contrast, when each of the peak frequencies of the first actual detected characteristic PSDz and each of the respective peak frequencies of the first typical characteristic PSDz0 coincide with each other, the CPU makes a "Yes" determination at step 930 and proceeds to step 935 to step 960 described below. Thereafter, the CPU proceeds to step 995 to terminate the present routine tentatively.

Step 935: the CPU acquires/calculates the longitudinal ground acceleration Ax, as described above.

Step 940: the CPU acquires the driving force Fd, the braking force Fb, and the running resistance TR, as described above.

Step 945: the CPU estimates/calculates the road inclination θs(n) based on the equation (2) described above. The value to which the suffix "n" is added represents a value acquired/estimated in the routine executed at present time. The road inclination θs(n) is referred to as the present road inclination θs(n).

Step 950: the CPU stores the present road inclination θs(n) calculated at step 945 into the RAM of the brake ECU 50.

Step 955: the CPU calculate an average of the present road inclination θs(n) and a previous road inclination θs(n−1). The previous road inclination θs(n−1) is a road inclination θs estimated at step 955 described later in the routine executed at the time point the predetermined constant time before the present time point. The previous road inclination θs(n−1) has been stored in the RAM of the brake ECU 50. Namely, the CPU obtains the average by performing "road inclination averaging proceeding ((θs(n)+θs(n−1))/2)".

Step 960: the CPU updates the road inclination θs by storing the average ((θs(n)+θs(n−1))/2) calculated at step 955 into the RAM as the road inclination θs, that is used for controlling the driving force Fd and/or the braking force Fb. Note that, step 955 may be omitted, and the present road inclination θs(n) calculated at step 950 may be stored into the RAM as the road inclination θs.

In this manner, the first apparatus is configured to:
acquire the wheel speed ωwi (i=fl, fr, rl, and rr) of each of the wheels (step 905);
acquire the longitudinal ground acceleration Ax based on the acquired wheel speed ωwi (i=fl, fr, rl, and rr) (step 935);
acquire the vertical acceleration Gz of the sprung mass of the vehicle 10 based on the output signals from the acceleration sensor 51 fixed to the sprung mass (step 915);

acquire the driving force Fd that the driving device 20 of the vehicle 10 generates, and the braking force Fb that the braking device 30 of the vehicle 10 generates (step 940); and perform the frequency analysis of the power spectrum density regarding the vertical vibration represented by (based on) the acquired vertical acceleration Gz to obtain the first actual detected characteristic PSDz (step 920).

In addition, the first apparatus is configured to estimate/extrapolate the road inclination θs based on parameters including the longitudinal ground acceleration Ax, the driving force Fd, the braking force Fb, and the running resistance TR, when "the first actual detected characteristic PSDz that is the power spectrum density analyzed with respect to the frequency of the vertical vibration of the sprung mass" has the two peak frequencies, one of them being within the first frequency range Δf1 and the other of them being within the second frequency range Δf2, wherein the first frequency range Δf1 is a range that includes "the first peak frequency f1 that is the natural frequency of the vehicle 10" that "the first typical characteristic PSDz0 that is the power spectrum density analyzed, under a specific condition where there is no disturbance applied to the wheel speed sensors, in advance with respect to the frequency of the vertical vibration of the sprung mass" has, and the second frequency range Δf2 is a range that includes "the second peak frequency f2 that is also the natural frequency of the vehicle 10" that the first typical characteristic PSDz0 has.

To the contrary, the first apparatus is configured to stop/prohibit estimating the road inclination θs, when the first actual detected characteristic PSDz has the peak frequency that falls neither in the first frequency range Δf1 nor in the second frequency range Δf2.

Accordingly, the first apparatus can estimate the road inclination θs without being affected by the disturbance applied to the sensor (wheel speed sensors). Consequently, the first apparatus can estimate the road inclination θs with a high degree of accuracy.

Second Embodiment

A road inclination estimating apparatus (hereinafter, referred to as a "second apparatus") of a vehicle according to a first embodiment of the present disclosure will next be described. Similarly to the first apparatus, the second apparatus is configured to perform the frequency analysis of the power spectrum density regarding the vertical vibration of the sprung mass of the vehicle 10 using (based on) the acquired vertical acceleration Gz to obtain the "first actual detected characteristic (or value) PSDz". In addition, the second apparatus is further configured to perform the frequency analysis of the power spectrum density regarding the longitudinal vibration of the sprung mass of the vehicle 10 using (based on) the acquired longitudinal acceleration Gx to obtain a "second actual detected characteristic (or value) PSDx". The second apparatus is configured to determine whether or not the second actual detected characteristic PSDx has peak frequencies that are within respective frequency ranges that include respective peak frequencies that a second typical characteristic (or value) PSDx0 has. In other words, the second apparatus is configured to determine whether or not each of the peak frequencies of the second actual detected characteristic PSDx and each of the peak frequencies of the second typical characteristic PSDx0 coincide with (agree with) each other. The second typical characteristic (or value) PSDx0 is frequency characteristic of power spectrum density of longitudinal vibration of the sprung mass of the vehicle 10 represented by the typical longitudinal acceleration Gz0. The second typical characteristic PSDx0 is acquired in advance under the specific condition where there is no disturbance applied to the wheel speed sensors, similarly to the first typical characteristic PSDz0.

Figure 10:
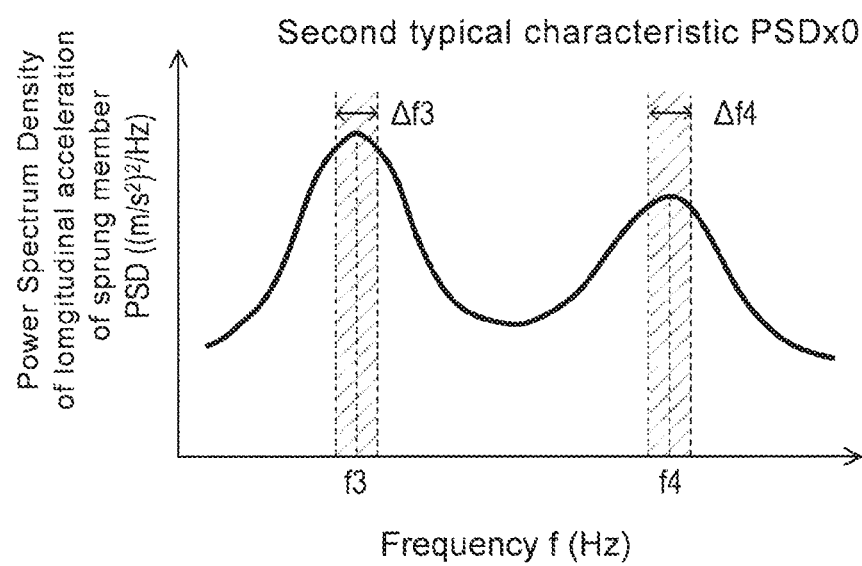
FIG. 10 is a graph showing frequency characteristic of power spectrum density (second typical characteristic) of longitudinal acceleration of the sprung mass.

As shown in FIG. 10, the second typical characteristic PSDx0 has a third peak frequency f3 and a fourth peak frequency f4 which is higher than the third peak frequency f3. The peak frequencies of the second typical characteristic PSDx0 are approximately equal to the peak frequencies of the first typical characteristic PSDz0, respectively. That is, the third peak frequency f3 is about 1 Hz and is approximately equal to the first peak frequency f1. The fourth peak frequency f4 is about 1.5 Hz and is approximately equal to the second peak frequency f2.

More specifically, the second apparatus is configured to calculate/estimate the road inclination θs (namely, is configured to perform the calculation to estimate the road inclination θs), when an estimation allowable condition for the second apparatus is determined to be satisfied. The estimation allowable condition for the second apparatus is determined to be satisfied, when both of the first estimation condition and a second estimation condition are determined to be satisfied. The first estimation condition is the same as the estimation allowable condition for the first apparatus. The first estimation condition is a condition (A) described below that is satisfied when the above described condition (1) and the above described condition (2) are both satisfied. The second estimation condition is a condition (B) described below.

Condition (A): One of the two peak frequencies that the first actual detected characteristic PSDz has is within the first frequency range Δf1 that includes the first peak frequency f1 that the first typical characteristic PSDz0 has, and the other one of the two peak frequencies that the first actual detected characteristic PSDz has is within the second frequency range Δf2 that includes the second peak frequency f2 that the first typical characteristic PSDz0 has.

Condition (B): One of the two peak frequencies that the second actual detected characteristic PSDx has is within a third frequency range Δf3 that includes the third peak frequency f3 that the second typical characteristic PSDx0 has, and the other one of the two peak frequencies that the second actual detected characteristic PSDx has is within a fourth frequency range Δf4 that includes the fourth peak frequency f4 that the second typical characteristic PSDx0 has.

In contrast, the second apparatus is configured to prohibit/stop calculating/estimating the road inclination θs (namely, is configured not to perform the calculation to estimate the road inclination θs), when at least one of the condition (A) and the condition (B) is not satisfied. Namely, the the second apparatus is configured to prohibit/stop calculating/estimating the road inclination θs when the estimation allowable condition for the second apparatus is not satisfied.

(Specific Operation)

<Estimation of the Road Inclination θs>

Next, specific operation of the second apparatus will next be described. The CPU of the second apparatus executes an "estimation of the road inclination routine" represented by a flowchart shown in FIG. 11, every time a predetermined constant time elapses. The steps shown in FIG. 11 that are the same as the respective steps shown in FIG. 9 are given the same reference numbers as those of the respective steps shown in FIG. 9.

The CPU starts processing from step 1100 at an appropriate timing and proceeds to step 905 so as to acquire the wheel speed ωwi (i=fl, fr, rl, and rr) of each of the wheels and calculate the vehicle speed SPD based on the acquired wheel speed ωwi.

Next, the CPU proceeds to step 910. When the vehicle speed SPD is lower than the predetermined speed SPDth, the CPU makes a "No" determination at step 910 and directly proceeds to step 1195 to terminate the present routine tentatively. Thus, in this case, the road inclination θs is not estimated.

Meanwhile, when the vehicle speed SPD is equal to or higher than the predetermined speed SPDth, the CPU makes a "Yes" determination at step 910 and proceeds to steps 915, 1110, 920, 1120, and 1130, as described below.

Step 915: the CPU acquires/obtains the vertical acceleration Gz of the sprung mass from the acceleration sensor 51.

Step 1110: the CPU acquires/obtains the longitudinal acceleration Gx of the sprung mass from the acceleration sensor 51.

Step 920: the CPU performs the PSD analysis of the vertical vibration based on the vertical acceleration Gz, and obtains the result of the PSD analysis as the first actual detected characteristic PSDz.

Step 1120: the CPU performs the PSD analysis of the longitudinal vibration based on the longitudinal acceleration Gx, and obtains the result of the PSD analysis as the second actual detected characteristic PSDx.

Step 1130: the CPU reads out the first typical characteristic PSDz0 and the second typical characteristic PSDx0 from the ROM of the brake ECU 50. The first typical characteristic PSDz0 and the second typical characteristic PSDx0 were obtained beforehand and have been stored in the ROM. Alternatively, the CPU may read out the first peak frequency f1, the second peak frequency f2, the third peak frequency f3, and the fourth peak frequency f4 from the ROM. Further alternatively, the CPU may read out the first frequency range Δf1, the second frequency range Δf2, the third frequency range Δf3, and the fourth frequency range Δf4, from the ROM.

Subsequently, the CPU proceeds to step 930. When each of the peak frequencies of the first actual detected characteristic PSDz and each of the peak frequencies of the first typical characteristic PSDz0 do not coincide with each other, the CPU makes a "No" determination at step 930 and directly proceeds to step 1195 to terminate the present routine tentatively. Thus, in this case, the road inclination θs is not estimated.

In contrast, when each of the peak frequencies of the first actual detected characteristic PSDz and each of the peak frequencies of the first typical characteristic PSDz0 coincide with each other, the CPU makes a "Yes" determination at step 930 and proceeds to step 1140 so as to determine whether or not each of the peak frequencies of the second actual detected characteristic PSDx and each of the peak frequencies of the second typical characteristic PSDx0 coincide with each other. When each of the peak frequencies of the second actual detected characteristic PSDx and each of the peak frequencies of the second typical characteristic PSDx0 do not coincide with each other, the CPU makes a "No" determination at step 1140 and directly proceeds to step 1195 to terminate the present routine tentatively. Thus, in this case, the road inclination θs is not estimated.

In contrast, when each of the peak frequencies of the second actual detected characteristic PSDx and each of the peak frequencies of the second typical characteristic PSDx0 coincide with each other, the CPU makes a "Yes" determination at step 1140 and proceeds to step 935 to step 960 that have been described above referring to FIG. 9. Thereafter, the CPU proceeds to step 1195 to terminate the present routine tentatively.

In this manner, the second apparatus is configured to estimate the road inclination θs, when (A) "the first actual detected characteristic PSDz that is frequency characteristic of power spectrum density of vertical vibration of the sprung mass of the vehicle 10" has the two peak frequencies, one of them being within the first frequency range Δf1 and the other of them being within the second frequency range Δf2, wherein the first frequency range Δf1 is the range that includes "the first peak frequency f1 that is the natural frequency of the vehicle 10" that "the first typical characteristic PSDz0 that is the frequency characteristic of power spectrum density of vertical vibration of the sprung mass of the vehicle 10 and is acquired in advance under the specific condition where there is no disturbance applied to the wheel speed sensors" has, and the second frequency range Δf2 is a range that includes "the second peak frequency f2 that is also the natural frequency of the vehicle 10" that the first typical characteristic PSDz0 has; and (B) "the second actual detected characteristic PSDx that is frequency characteristic of power spectrum density of longitudinal vibration of the sprung mass of the vehicle 10" has the two peak frequencies, one of them being within the third frequency range Δf3 and the other of them being within the fourth frequency range Δf4, wherein the third frequency range Δf3 is a range that includes "the third peak frequency f3 that is the natural frequency of the vehicle 10" that "the second typical characteristic PSDx0 that is the frequency characteristic of power spectrum density of longitudinal vibration of the sprung mass of the vehicle 10 and is acquired in advance under the specific condition where there is no disturbance applied to the wheel speed sensors" has, and the fourth frequency range Δf4 is a range that includes "the fourth peak frequency f4 that is also the natural frequency of the vehicle 10" that the second typical characteristic PSDx0 has.

To the contrary, the second apparatus is configured to stop/prohibit estimating the road inclination θs, when the first actual detected characteristic PSDz has the peak frequency that falls neither in the first frequency range Δf1 nor in the second frequency range Δf2, or when the second actual detected characteristic PSDx has the peak frequency that falls neither in the third frequency range Δf4 nor in the fourth frequency range Δf4.

In this manner, in the second apparatus, a condition for allowing the estimation of the road inclination θs (i.e., the estimation allowance condition for the second apparatus) includes not only the condition (A) that the peak frequencies of the first actual detected characteristic PSDz coincide with the respective peak frequencies of the first typical characteristic PSDz0, but also the condition (B) that the peak frequencies of the second actual detected characteristic PSDx coincide with the respective peak frequencies of the second typical characteristic PSDx0. Consequently, the second apparatus can estimate the road inclination θs with a higher degree of accuracy.

MODIFICATIONS

The apparatus according to the present disclosure is not limited to the above embodiments, and various modifications are possible without departing from the scope of the disclosure.

For example, the longitudinal ground acceleration Ax is the average of the wheel speeds ωwi (i=fl, fr, rl, and rr) of the wheels (WFL, WFR, WRL, and WRR) in the above embodiments, however, the longitudinal ground acceleration Ax may be an average of two wheel speeds other than (excluding) a maximum wheel speed and a minimum wheel speed among the four wheel speeds. Alternatively, the longitudinal ground acceleration Ax may be a median value of the four wheel speeds ωwi (i=fl, fr, rl, and rr). Furthermore, the longitudinal ground acceleration Ax may be an average of the wheel speed ωwfl of the front left wheel WFL that is a driving wheel and the wheel speed ωwfr of the front right wheel WFR that is also a driving wheel. Moreover, the longitudinal ground acceleration Ax may be calculated based on an only specific one of the four wheel speeds ωwi (i=fl, fr, rl, and rr).

In the above embodiments, the first typical characteristic PSDz and the second typical characteristic PSDx (or the first peak frequency f1, the second peak frequency f2, the third peak frequency f3, and the fourth peak frequency f4) are acquired under the specific condition obtained when/by shaking/vibrating the vehicle 10 on the shaking table (vibration test table), however, the first typical characteristic PSDz and the second typical characteristic PSDx may be acquired when/by making/letting the vehicle 10 run on a flat asphalt-paved road having a good/smooth surface.

In the above road inclination estimating apparatuses are applied to (or installed in) the vehicle 10 that is a front-wheel drive type vehicle, however, the road inclination estimating apparatuses according to the present disclosure may be applied to (or installed in) the vehicle 10 that is a rear-wheel drive type vehicle or a four-wheel drive vehicle.

In the above embodiments, the frequency analysis of the vibration of the sprung mass is based on the power spectrum density, however, the frequency analysis may be performed using fast Fourier transform (FFT) so at to obtain/acquire the peak frequencies as well as the first peak frequency f1, the second peak frequency f2, the third peak frequency f3, and the fourth peak frequency f4.

What is claimed is:

1. A road inclination estimating apparatus of a vehicle having wheels, configured to estimate a road inclination of a road on which said vehicle is running, comprising:
   a wheel speed sensor configured to generate a signal indicative of a wheel speed of each of the wheels;
   an acceleration sensor configured to generate a signal indicative of a vertical acceleration of a sprung mass of said vehicle; and
   an electronic unit configured to:
      acquire a longitudinal ground acceleration of said vehicle based on said wheel speed;
      acquire a driving force generated by a driving device of said vehicle and a braking force generated by a braking device of said vehicle;
      perform a frequency analysis of a vertical vibration of said sprung mass based on said vertical acceleration represented by said signal generated by said acceleration sensor to acquire peak frequencies of said vertical vibration;
      determine whether or not a first estimation condition is satisfied, said first estimation condition being satisfied when said acquired peak frequencies of said vertical vibration are within respective frequency ranges that include respective natural peak frequencies of said vertical vibration being inherent for said vehicle and acquired in advance;
      acquire wheel speeds of each of the wheels based on the signal indicative of the wheel speed;
      calculate a speed of the vehicle based on the acquired wheel speeds;
      determine whether or not the vehicle speed is equal to or greater than a predetermined threshold speed;
      upon determination that the vehicle speed is not equal to or greater than the predetermined threshold speed, not estimate the road inclination of the road on which the vehicle is running; and
      upon determination that the vehicle speed is equal to or greater than the predetermined threshold speed:
      estimate said road inclination based on parameters including said longitudinal ground acceleration, said driving force, and said braking force, when it is determined that an estimation allowable condition is satisfied, said estimation allowable condition being satisfied when said first estimation condition is determined to be satisfied;
      stop estimating said road inclination when it is determined that said estimation allowable condition is not satisfied; and
      control the vehicle based on the estimated road inclination.

2. The road inclination estimating apparatus according to claim 1,
   wherein
   said electronic unit is configured to:
      acquire power spectrum density characteristic of said vertical vibration as a result of said frequency analysis of said vertical vibration;
      determine that said first estimation condition is satisfied, when said power spectrum density characteristic of said vertical vibration has two of said acquired peak frequencies of said vertical vibration, wherein, one of said two of said peak frequencies of said vertical vibration is within a first frequency range that includes a first peak frequency that is one of said natural peak frequencies of said vertical vibration, and the other one of said two of said peak frequencies of said vertical vibration is within a second frequency range that includes a second peak frequency that is another one of said natural peak frequencies of said vertical vibration, and said second peak frequency is higher than said first peak frequency.

3. The road inclination estimating apparatus according to claim 1, further comprising:
   an acceleration sensor configured to generate a signal indicative of a longitudinal acceleration of said sprung mass of said vehicle,
   wherein
   said electronic unit is configured to:
      perform a frequency analysis of a longitudinal vibration of said sprung mass based on said longitudinal acceleration represented by said signal generated by said acceleration sensor to acquire peak frequencies of said longitudinal vibration;
      determine whether or not a second estimation condition is satisfied, said second estimation condition being satisfied when said acquired peak frequencies of said longitudinal vibration are within respective frequency ranges that include respective natural peak frequencies of said longitudinal vibration being inherent for said vehicle and acquired in advance; and determine that said estimation allowable condition is satisfied, when both of said first estimation condition and said second estimation condition are determined to be satisfied.

4. The road inclination estimating apparatus according to claim 3, wherein said electronic unit is configured to:

acquire power spectrum density characteristic of said vertical vibration as a result of said frequency analysis of said vertical vibration;

determine that said first estimation condition is satisfied, when said power spectrum density characteristic of said vertical vibration has two of said acquired peak frequencies of said vertical vibration, wherein, one of said two of said peak frequencies of said vertical vibration is within a first frequency range that includes a first peak frequency that is one of said natural peak frequencies of said vertical vibration, and the other one of said two of said peak frequencies of said vertical vibration is within a second frequency range that includes a second peak frequency that is another one of said natural peak frequencies of said vertical vibration, and said second peak frequency is higher than said first peak frequency;

acquire power spectrum density characteristic of said longitudinal vibration as a result of said frequency analysis of said longitudinal vibration; and determine that said second estimation condition is satisfied, when said power spectrum density characteristic of said longitudinal vibration has two of said acquired peak frequencies of said longitudinal vibration, wherein, one of said two of said peak frequencies of said longitudinal vibration is within a third frequency range that includes a third peak frequency that is one of said natural peak frequencies of said longitudinal vibration, and the other one of said two of said peak frequencies of said longitudinal vibration is within a fourth frequency range that includes a fourth peak frequency that is another one of said natural peak frequencies of said longitudinal vibration, and said fourth peak frequency is higher than said third peak frequency.

* * * * *